US012762938B1

(12) United States Patent
Muench

(10) Patent No.: US 12,762,938 B1
(45) Date of Patent: Oct. 13, 2026

(54) METHOD AND/OR SYSTEM FOR MODIFYING A VEHICLE AND/OR MODIFYING A FINISHED CHILD CAR SEAT TO PROVIDE INFORMATION TO A USER

(71) Applicant: Jeffrey Muench, Potomac, MD (US)

(72) Inventor: Jeffrey Muench, Potomac, MD (US)

( * ) Notice: Subject to any disclaimer, the term of this patent is extended or adjusted under 35 U.S.C. 154(b) by 12 days.

(21) Appl. No.: 18/216,191

(22) Filed: Jun. 29, 2023

(51) Int. Cl.

| | |
|---|---|
| ***G08B 21/02*** | (2006.01) |
| ***B60N 2/00*** | (2006.01) |
| ***B60Q 5/00*** | (2006.01) |
| ***G08B 3/10*** | (2006.01) |
| ***G08B 21/22*** | (2006.01) |

(52) U.S. Cl.
CPC ......... *G08B 21/0205* (2013.01); *B60N 2/003* (2023.08); *B60N 2/0035* (2023.08); *B60Q 5/005* (2013.01); *G08B 3/10* (2013.01); *G08B 21/22* (2013.01); *B60N 2210/30* (2023.08); *B60N 2230/20* (2023.08)

(58) Field of Classification Search
CPC ...... G08B 21/0205; G08B 3/10; G08B 21/22; B60N 2/003; B60N 2/0035; B60N 2210/30; B60N 2230/20; B60Q 5/005
See application file for complete search history.

(56) References Cited

U.S. PATENT DOCUMENTS

| | | | | |
|---|---|---|---|---|
| 6,445,287 | B1 * | 9/2002 | Schofield | B60C 23/00 340/447 |
| 7,100,981 | B2 | 9/2006 | Mack | |
| 7,218,218 | B1 | 5/2007 | Rogers | |
| 7,250,869 | B2 | 7/2007 | Davis | |
| 7,478,875 | B2 | 1/2009 | Patterson | |
| 7,663,493 | B2 | 2/2010 | Monzo | |
| 8,504,235 | B2 | 8/2013 | Inayoshi | |
| 9,969,328 | B1 | 5/2018 | Dada | |
| 10,252,640 | B2 | 4/2019 | Cech | |
| 11,052,854 | B2 | 7/2021 | Killebrew | |
| 11,186,244 | B2 | 11/2021 | Zancanato | |
| 11,260,816 | B1 | 3/2022 | Bodenhamer | |
| 2006/0290518 | A1 * | 12/2006 | Bingle | G07C 9/00174 340/573.1 |
| 2009/0027188 | A1 * | 1/2009 | Saban | B60N 2/268 340/439 |
| 2017/0116839 | A1 * | 4/2017 | Friedman | G08B 21/0269 |

* cited by examiner

*Primary Examiner* — Omeed Alizada
(74) *Attorney, Agent, or Firm* — GARCIA-ZAMOR INTELLECTUAL PROPERTY LAW, LLC; Ruy Garcia-Zamor

(57) ABSTRACT

A method and/or system for modifying a vehicle and/or modifying a finished child car seat to provide information to a user regarding the potential exposure of a child within the vehicle to dangerous predetermined conditions and alert relevant parties to the presence of danger therein. The method and/or system enhances the safety with which infants and children can be transported in a vehicle.

20 Claims, 18 Drawing Sheets

METHOD AND/OR SYSTEM FOR MODIFYING A VEHICLE AND/OR MODIFYING A FINISHED CHILD CAR SEAT TO PROVIDE INFORMATION TO A USER

BACKGROUND

The present invention relates generally to vehicle and/or child car seat modifications. More specifically the preferred embodiments of the present invention relate to method for modifying a vehicle and/or a finished child car seat such that it can monitor various conditions within the vehicle and provide alerts thereto.

It may be advantageous to provide a method for modifying a vehicle and/or child car having at least one of: a structure, such as a control housing, which may allow for the attachment of a sensor to the inside of the vehicle which may be configured to measure, record, and/or report on one or more conditions within the vehicle; a structure, such a controller housing which may allow for the monitoring of the presence of an occupant in a designated portion of the vehicle; a system which may report on the condition of the vehicle dependent on the presence of an occupant in a designated portion of the vehicle; a system which may monitor for the presence of an alert condition determined by an acceptable range of measured values actively monitored in the vehicle; a system which may report on unsafe conditions in a vehicle; a system which may selectively provide alert conditions to designated users and/or individuals nearby a vehicle when a predetermined alert condition is measured within the vehicle; a device which may be separably added to a vehicle and/or a finish child car seat such that the presence of an occupant may be measured, recorded, and/or reported; a device which may be configured to determine when an occupant is present in a designated area of the vehicle, such that measurements towards the other conditions of the vehicle such as temperature may be selectively reported based on occupancy status; a device which may be separably added to a vehicle and/or a finish child car seat such that when at least one occupant is present in the vehicle unsafe conditions such as excessive temperature may be reported to designated users and/or persons outside the vehicle; a device which may be configured to report when the occupant of the vehicle who is unable to protect themselves, may be in danger due to environmental conditions such as temperature; a system which is easy to manufacture; easy to use; aesthetically pleasing; and/or easy to separably install and/or uninstall which may provide safety and/or convenience for users and/or individuals who may become occupants of the vehicle under the control of a user.

SUMMARY

Briefly speaking, one aspect of the present invention is directed to a method for modifying a finished vehicle car seat and/or a vehicle wherein the presence of an occupant in a designated portion of the vehicle can be monitored for occupancy and when occupancy is determined, sensors within the vehicle may selectively report on predetermined values. The method may evaluate, on a consistent basis, the presence of an occupant and the status of at least one measured condition, selectively reporting when the latter exceeds pre-determined acceptable ranges. The method may utilize interchangeable, off-the-shelf sensors such as pressure pads, thermometers, and thermocouples, to monitor the presence of an occupant within a finish child car seat located within the vehicle and send an alert signal when temperatures exceed or fall below an acceptable range while an occupant is present.

In a separate aspect, the present invention is directed towards a method for separably adding to a vehicle interior a device which may be configured to receive data from one or more sensors recording conditions within a vehicle and report thereon via at least one of: an internal speaker, an external speaker, a wireless speaker, a light, an alarm, a wireless cellular device, a wireless personal device, a cloud-based reporting system, or the like.

In a separate aspect, the present invention may be directed towards a method for separably adding a pressure sensor to a vehicle seat and/or a finish child car seat such that the occupancy of the child car seat may be monitored, recorded, and reported on.

In a separate aspect, the present invention may be directed towards a method for reporting on unsafe conditions within a vehicle when another condition, such as the occupancy of portion of the vehicle, is met. This may provide a mechanism through which excessive temperatures within a vehicle may be reported to the user of the device and/or persons nearby the vehicle when a child is occupying a child holding area or other designated portion of the vehicle.

In a separate aspect, the present invention may be directed towards a method for monitoring at least one potentially hazardous condition within a vehicle and reporting the presence of that condition via an alert signal. The alert signal may constitute a visual and/or audible alert to individuals in the vicinity of the vehicle via lights and or speakers, and to individuals not in the vicinity of the vehicle via notifications to wireless personal devices.

In a separate aspect, the present invention may be directed towards a method for configuring a prefabricated child car seat and/or vehicle seat to report on the presence of an occupant. This reporting function and/or device may be engaged and/or disengaged via manual controls present on a portion of the device within the vehicle and/or on an application configured to be interacted with on a personal internet connected device.

In a separate aspect, the present invention may be directed towards a method of configuring an electronic-free finished vehicle car seat and/or vehicle seat to monitor for occupancy of a portion of the vehicle and create an occupancy signal based thereon which may be utilized in the determination of an alert condition. The method may selectively report information, to individuals nearby the vehicle and/or predetermined users of the system, regarding the alert condition via alarms, lights, notifications, and/or spoken verbal commands from a speaker.

In a separate aspect, the present invention may be directed towards a method for ensuring that a child left within a vehicle is not at risk to physical harm created by excessively high and/or low temperatures which may be present within the vehicle. The present invention may accomplish this by providing for a separably engageable system for modifying a portion of the vehicle and/or a finished child car seat to determine occupancy and monitor for temperature. The present invention may report via an alarm when the temperature is unsafe, and an occupant is present in the finished child car seat.

In a separate aspect, the present invention may be directed towards a method for ensuring that the wards of users of the system are not exposed to dangerous conditions. This may be accomplished by providing a device which may be attached to the interior and/or exterior of the vehicle configured to measure for unsafe conditions, and the occupancy of the vehicle, and selectively report on the presence of unsafe conditions when occupancy is simultaneously found.

In a separate aspect the present invention is directed towards a system for monitoring the conditions within a vehicle such that when an occupant of a designated portion therein is determined to be present, dangerous environmental factors may likewise be reported.

In a separate aspect the present invention is directed towards a system for evaluating if an occupant is present within a finished child car seat mounted within a vehicle. The system may be configured to monitor environmental conditions within the vehicle and report dangerous conditions to users of the system and/or other persons nearby the vehicle.

In a separate aspect the present invention is directed towards a system for modifying a finished electronic-free finished vehicle car seat and/or a finished child car seat such that it can alert users of the system and/or individuals nearby a vehicle to potentially endangered occupants of the vehicle when the system detects conditions outside acceptable ranges.

In a separate aspect the present invention is directed towards a vehicle which is modified with a system configured to provide users with the ability to passively monitor the vehicle for dangerous environmental conditions which may be present while a child is occupying the vehicle. Preferably the system is configured to provide notifications of dangerous conditions to users of the system and/or persons nearby the vehicle.

BRIEF DESCRIPTION OF THE DRAWINGS

The foregoing summary, as well as the following detailed description of the preferred embodiments of the present invention will be better understood when read in conjunction with the appended drawings. For the purposes of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings.

DETAILED DESCRIPTION OF THE PREFERRED EMBODIMENT

Figure 1:
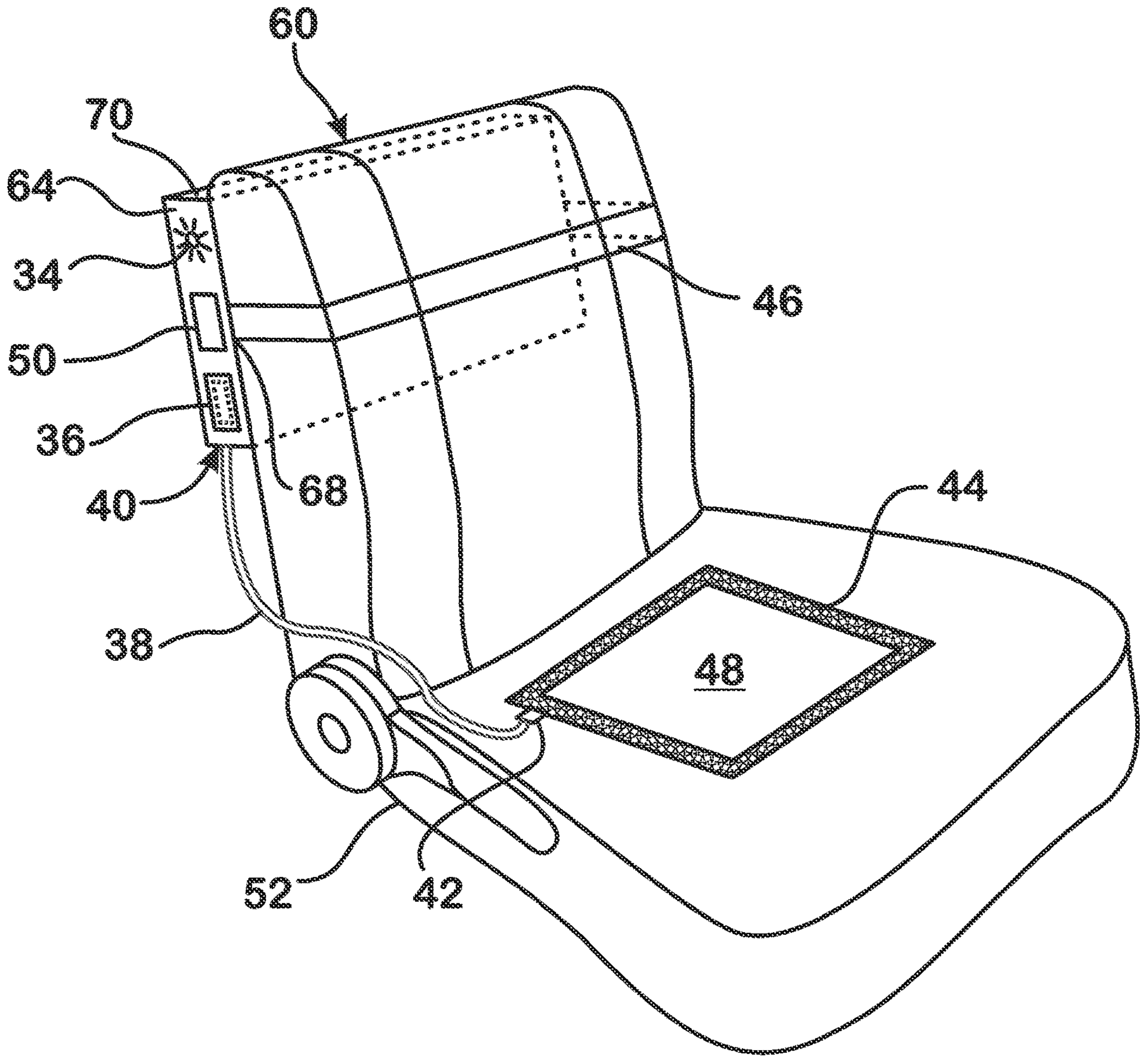
FIG. 1 is a three quarters perspective view of one preferred embodiment of the device 30, while it is engaged with a finished vehicle seat 52. The device 30 may be comprised of a control unit 32, a temperature sensor 36, and a pressure sensor 48. The control unit 32 may be separably attached to the rear of a vehicle seat 52 via a control panel strap 46 which wraps around the vehicle seat 52 and is mounted to the control panel 32 at control panel strap mounting points 68. A temperature sensor 36 is preferably located within the interior of the vehicle and physically attached to the control unit 32 or otherwise configured to report information to the control unit 32. The pressure pad 48 may be separably connected to the control unit 32 via an attachment table 38 which integrates with the control panel via an I/O port 40 on the unit 32, and with the pressure pad 48 a pressure pad connection point 42. The pressure pad 48 may be, but is not necessarily, separably mounted to the vehicle seat 52 via a physical connection mechanism 44 such as adhesive, hook and loop, or straps. The control unit 32 may also be configured to report constantly on the pressure pad's 48 reported condition via a notification light 34 which may be located on the right side panel 64 of the control unit 32.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the device 30. The terms "downward" and "upward refers to directions above and below the center of the device 30, respectively, unless specified otherwise. The terms "forward" and "front" refer to a direction in front of the device 30 and the term "rear" refers to a direction behind the device 30. The terms "axial" and "radial" refer to directions towards and away from the center of the referenced component respectively. The term "finished child car seat," as used in the specification and claims, means "an infant and/or child car seat that is fully assembled and complete and ready for use or an infant and/or child car seat that is fully manufactured and ready for sale or shipment to a consumer or intermediary." The term "generally aligned" refers to objects which functionally form a single surface such that for low precision mechanical applications they can be treated as uniform. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (200%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "transverse," as used in the specification, means "situated or extending across something, such as along a side of an object." The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring to FIGS. 1-18, a method of modifying a vehicle and modifying a finished child car seat, according to preferred embodiments of the present invention is shown. Multiple preferred implementations of the preferred embodiments of the present invention will be described below (alone or in combination with various embodiments of the device 30). Unless otherwise stated, similar structures or functions described in conjunction with the below devices preferably, but not necessarily, operate in a generally similar manner to that described elsewhere in this application.

One preferred embodiment of the present invention is directed to a device 30 for modifying a portion of the interior of a vehicle 84, a finished car seat 52 (herein referred to also as a "finished vehicle seat", a "vehicle seat" and a "car seat") and/or a finished child car seat 54 (herein referred to also as a "child car seat"), to notify a user to an alert condition. Preferably, the device 30 may be incorporated into an aftermarket vehicle 84 and/or an aftermarket finished child car seat 54 such that conditions regarding the interior of the vehicle 84 and the occupancy of a finished child car 52 seat can be monitored. More preferably the method provides a mechanism through which dangerous conditions within the vehicle 84 can be reported to a user.

Alternatively, the present invention is directed to a device 30 which may be incorporated into a vehicle 84 interior and a vehicle 84 exterior and/or a wireless computing device 110 (herein referred to also as a "cellphone" and a "personal wireless device") such that an alert signal is provided to a user and/or persons nearby the vehicle 84 when the device 30 determines that a predetermined dangerous condition is present within the vehicle 84. Preferably the alert signal is determined by a control unit 32 located within the interior of the vehicle and receives signals from aftermarket sensors also located within the vehicle 84. The control unit 32, upon determining that an alert condition exists, may provide an alert signal via a notification module (herein referred to also as a "communication chip" and a "wireless chip") to at least one of: the wireless computing device 110, an aftermarket speaker 86 located within the vehicle, and an aftermarket speaker 86 located on the exterior of the vehicle.

Alternatively, the present invention is directed towards a method for modifying the interior of a vehicle 84, to monitor for dangerously high or low temperatures via a temperature sensor 36, monitor for the occupancy of a portion of the vehicle, and deliver alert signals configured to notify persons nearby the vehicle and/or users of the system to the presence of an alert condition when the finished child car seat is actively occupied by a child. Preferably the system may be configured to only send an alert signal when the temperature within the vehicle exceeds a first predetermined temperature or falls below a second predetermined temperature while an occupancy signal is simultaneously present. Preferably an aftermarket speaker 86 may be located on an exterior of the vehicle and may be in constant communication with a control unit 32 located within the interior of the vehicle. The aftermarket speaker 86 may be configured to send an alert signal consisting of loud sounds and/or verbal instructions to persons that may be nearby the vehicle 84. The device 30 of the present method may also be configured to send an alert signal to a cell phone application 112 installed on a cell phone 110.

Referring now to FIG. 1, depicted therein is the device 30 affixed to a finished vehicle seat 52. Preferably the device 30 is comprised of a control panel 32 (herein referred to also as a "control unit") and at least one external pressure pad 48. The pressure pad 48 may be configured to be held against the base of a finished car seat 54 by a pressure pad attachment mechanism 44 such as hooks and loops. One of ordinary skill in the art will appreciate from this disclosure that the attachment mechanism 44 may be comprised of any mechanical device or combination thereof which may hold a thin pad in place against a vehicle seat 52 such as adhesive, hooks, and straps, without departing from the scope of the present invention. Preferably, the control panel 32 further comprises a notification light 34, a communication chip 50, a temperature sensor 36 (herein referred to also as a "thermometer"), a control panel scrap 46 and an I/O port 82 which may be disposed on a 110 block 40 of the panel 32. The panel 32 may be affixed with a control strap 46 to the rear of the vehicle seat 52 back and connected to the pressure pad 48 via an attachment cable 38 which connects to an I/O port 82 and a pressure pad connection point 42. One of ordinary skill in the art will appreciate from this disclosure that the method may utilize any communication medium to obtain signals from sensors 36, 48 without departing from the scope of the present invention.

Figure 2:
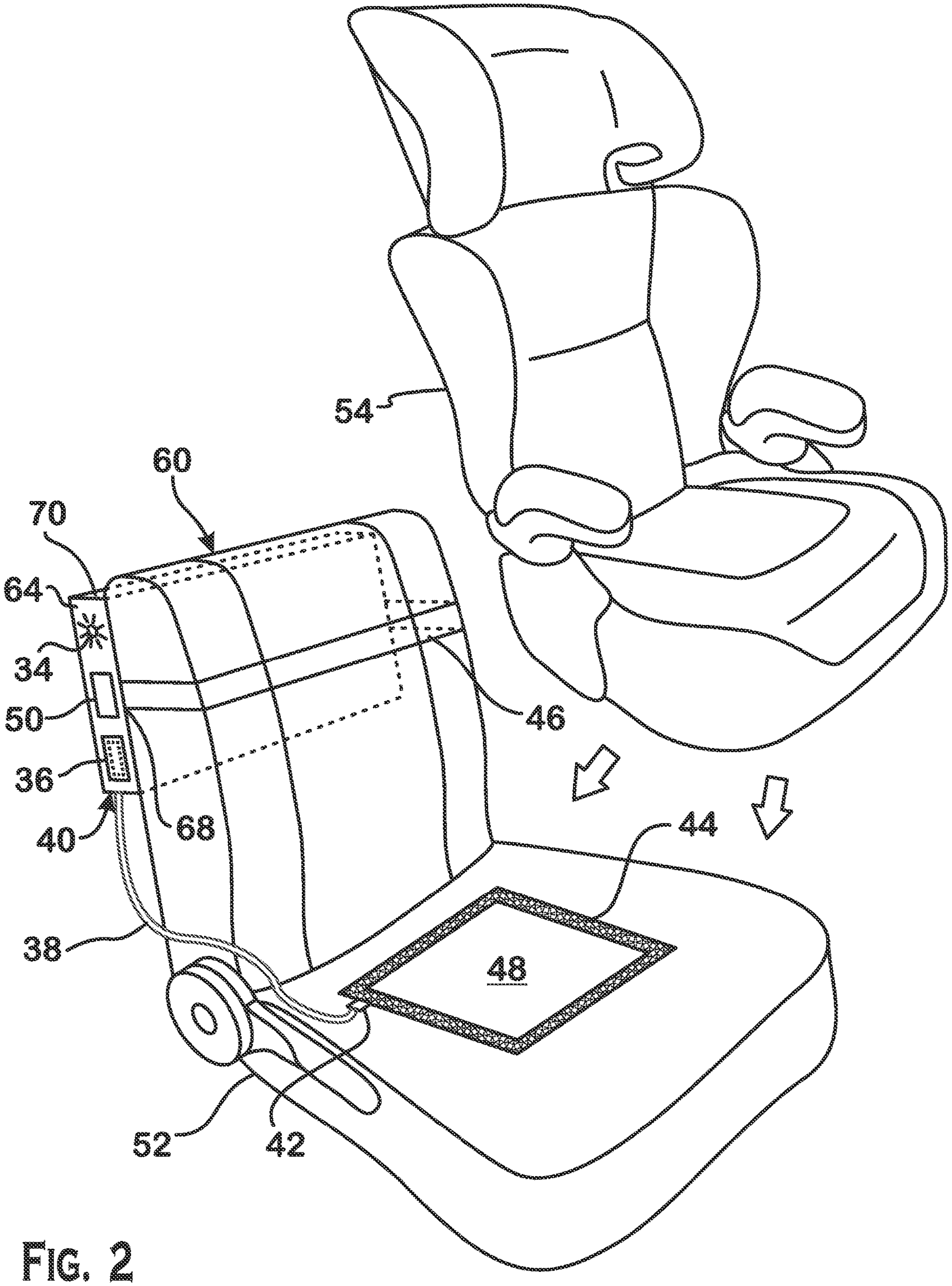
FIG. 2 is a three quarters perspective view of one preferred embodiment of the device 30 while a finish child car seat 54 is being separably engaged with a finished vehicle seat 52 after the device 30 of the present method has been attached to the finished vehicle seat 52.

Referring now to FIG. 2, an aftermarket finished child car seat 54 is depicted above a vehicle seat 52 into which it is being installed. Preferably the pressure pad 48 of the device 30 is configured to sit between the finished child car seat 54 and the base of the vehicle seat 52. By being positioned between the child car seat 54 and the vehicle seat 52, the pressure pad 48 may sense when a child is present in the child car seat 54 via a change in pressure which is interpreted by the control panel 32 as an occupancy signal.

Figure 3:
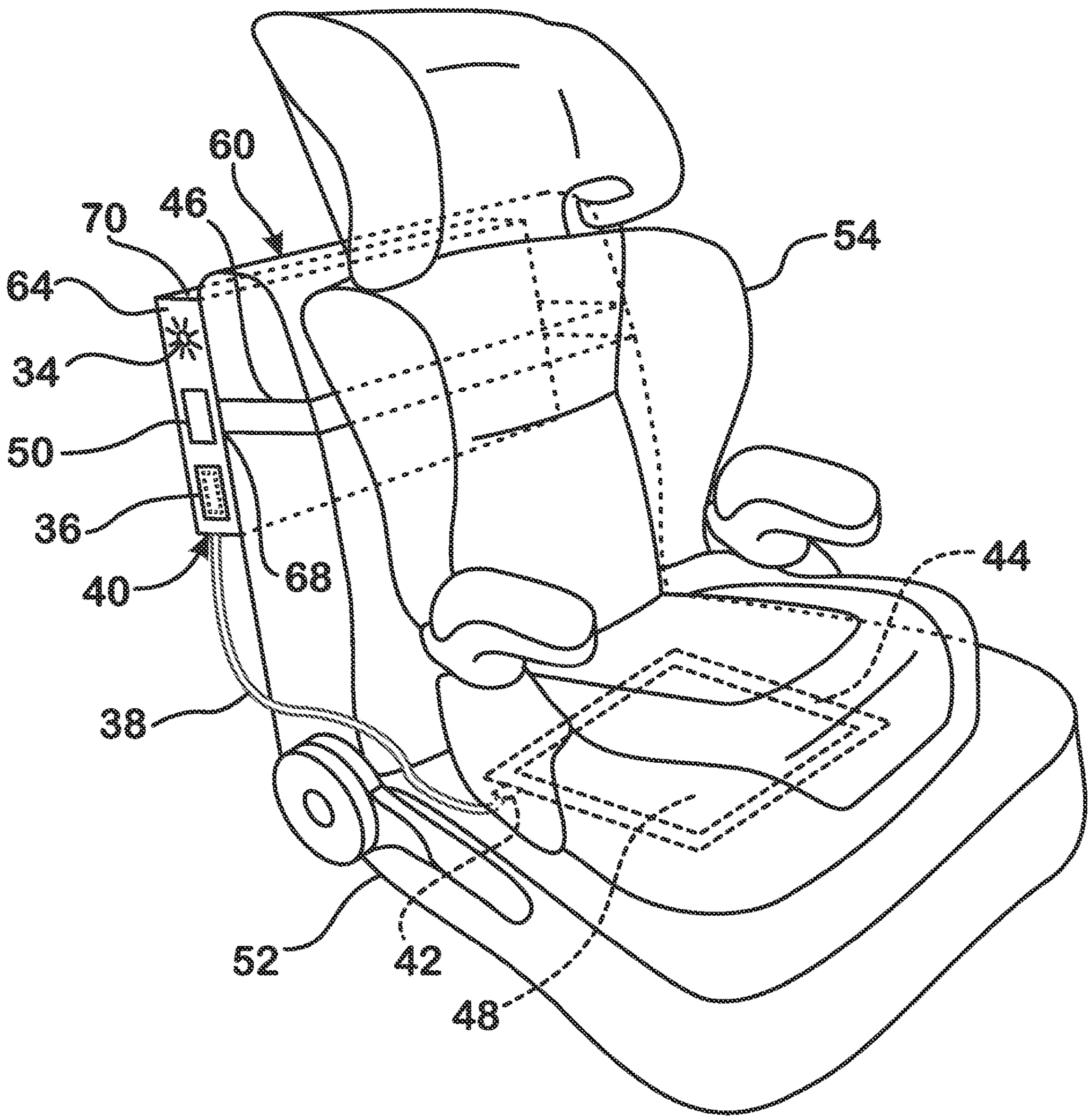
FIG. 3 is a three quarters perspective view of one preferred embodiment of the device 30 engaged with a finished vehicle seat 52 and a finished child car seat 54 such that the occupancy status of the finished child car seat 54 is measured by the pressure pad 48.

Referring now to FIG. 3, the installed device 30 is depicted. The control panel 32 may be located on the rear of the back of the vehicle seat 52 such that it does not occlude space which the finished child car seat 54 occupies. One of ordinary skill in the art will appreciate from this disclosure, that the individual components of the device 30 may be located anywhere in, on, or nearby the vehicle without departing from the scope of the present invention.

Figure 4:
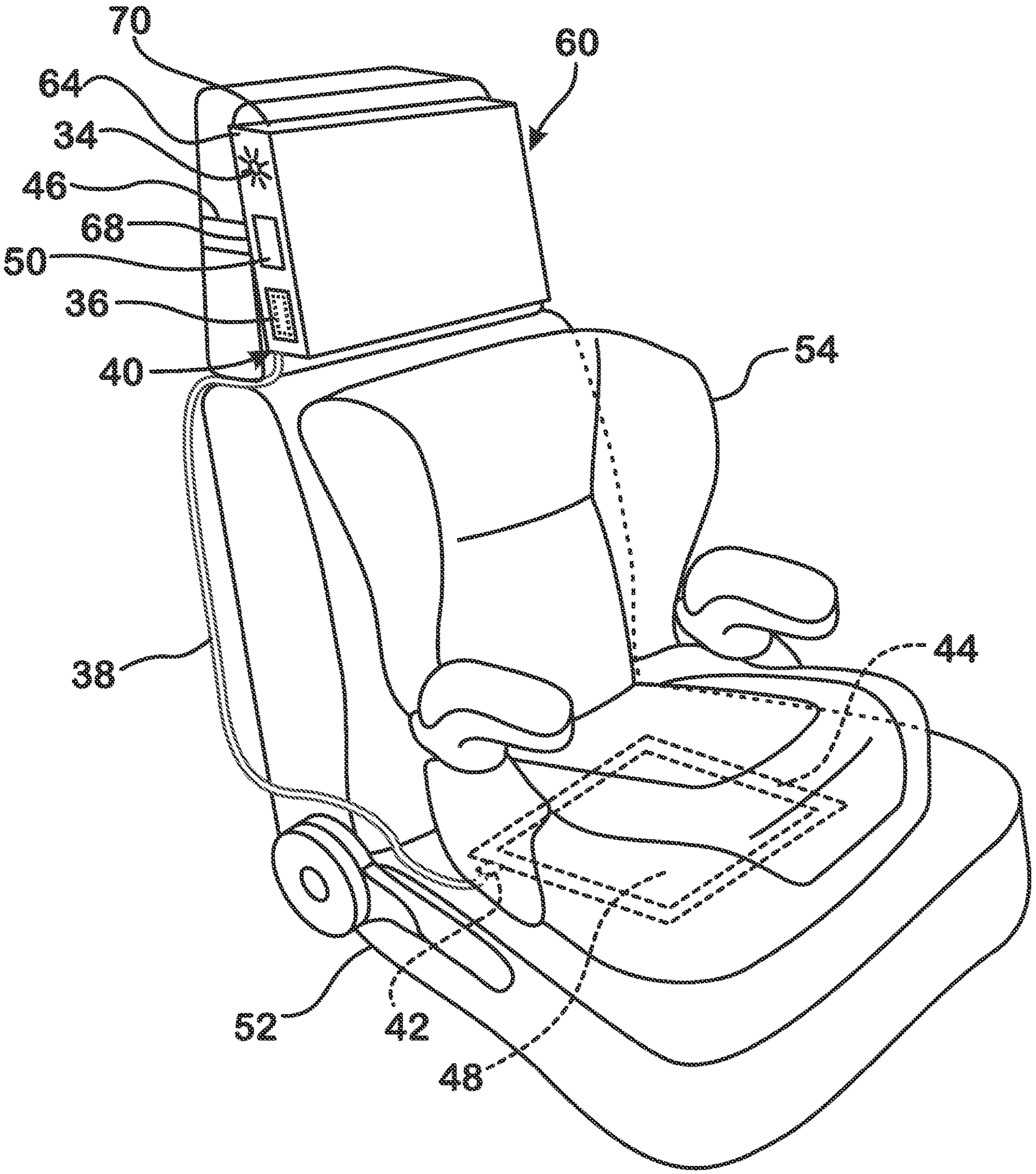
FIG. 4 is a three quarters perspective view of one preferred embodiment of the device 30 engaged with a finished vehicle seat 52 and a finished child car seat 54 such that the occupancy status of the finished child car seat 54 is measured by the pressure pad 48. Preferably the control unit 32 may be engaged with the finished vehicle seat 52 at any location such as above a finished child car seat 54.

Referring now to FIG. 4, the control panel 32 may be affixed to the front of the headrest of the vehicle seat 52 such that a small child car seat 54 may be positioned thereunder.

Figure 5:
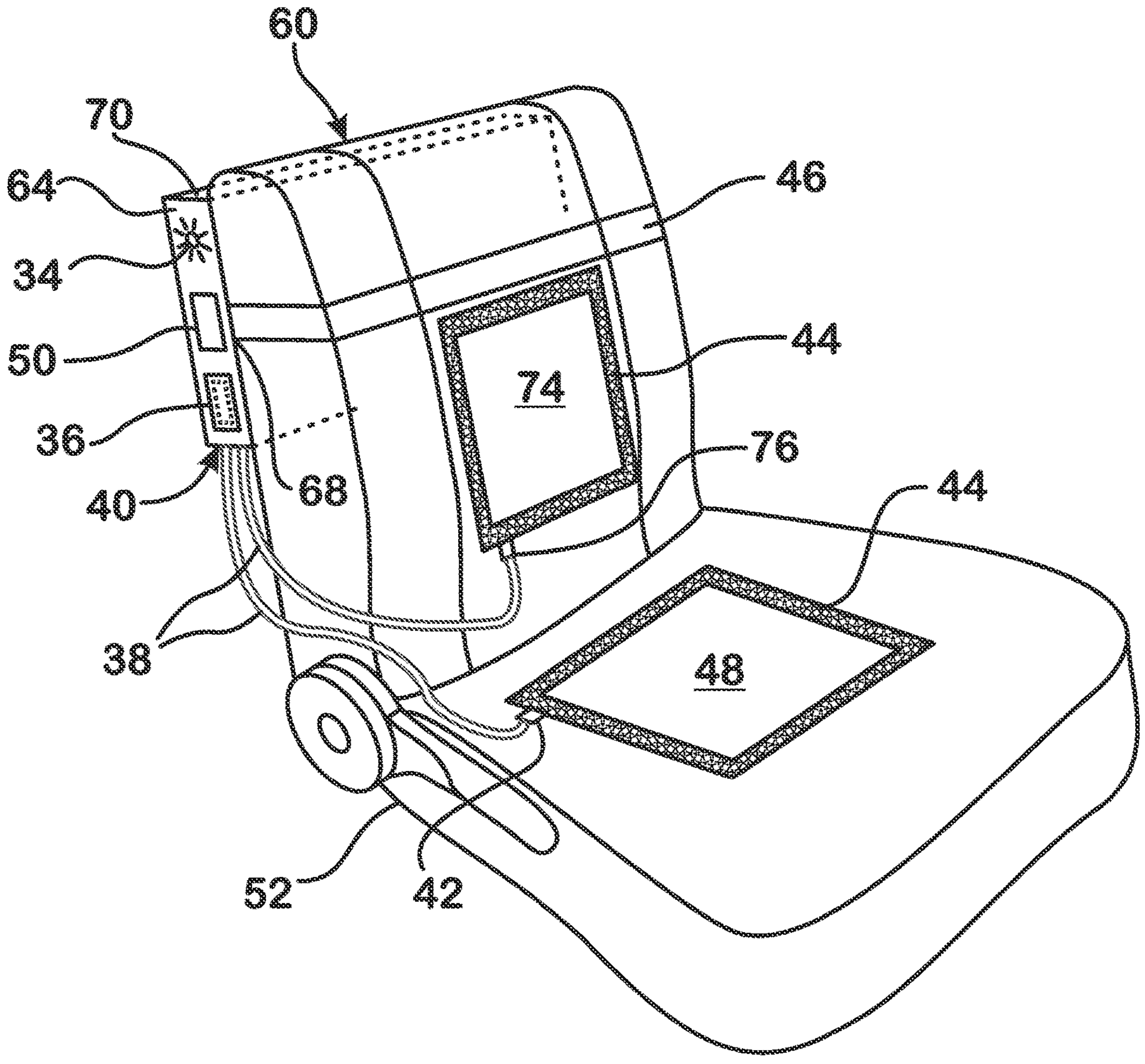
FIG. 5 is a three quarters perspective view of one preferred embodiment of the device 30 wherein a rear pressure pad 74 is configured to record and report information to the control unit 32 alongside a primary pressure pad 48.

Referring now to FIG. 5, the control panel 32 may be configured to be connected to a second rear pressure pad 74. The rear pressure pad 74 may be located on the seatback of the vehicle seat 52. Preferably the rear pressure pad 74 is affixed to the seatback by a pressure pad attachment mechanism 44. The rear pressure pad 74 may be configured to provide rear pressure information to the control panel 32 which may allow the device 30 to determine the occupancy status of the child car seat 54 with a higher degree of accuracy and/or allow the device 30 to determine where physically a child is positioned within the child car seat 54. By determining positioning within a car seat 54, the device 30 may be configured to alert users to if the child is attempting to move from the child car seat 54 during the operation of vehicle 84.

Figure 6:
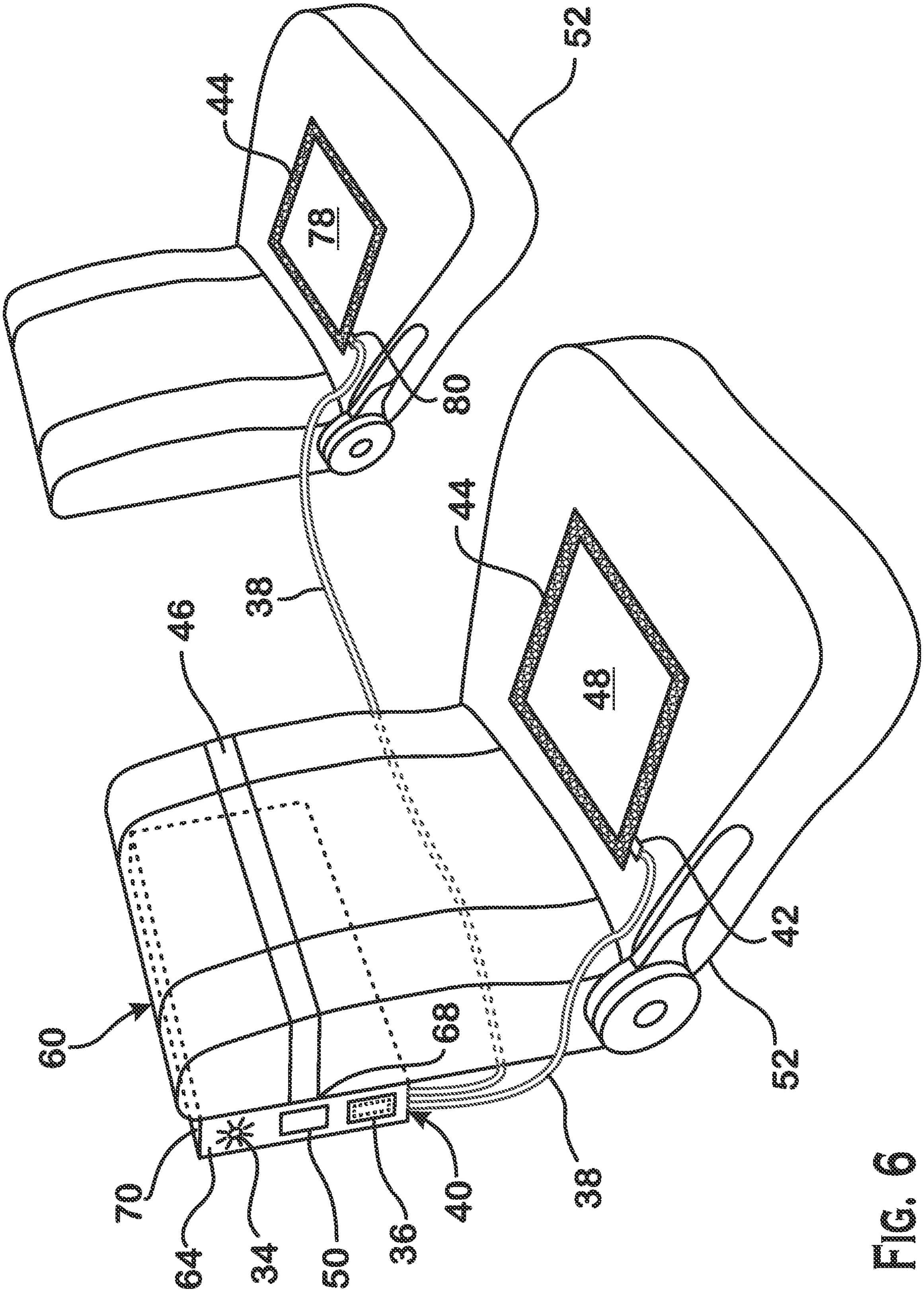
FIG. 6 is a three quarters perspective view of one preferred embodiment of the device 30 wherein an adjacent pressure pad 74 may be configured to record and report information regarding the occupancy of a second vehicle seat 52 to the control unit 32, alongside the first pressure pad 48. In this embodiment, the device 30 may be configured to monitor and report on dangerous conditions when at least one of a plurality of vehicle seats 52 are determined to be occupied.

Referring now to FIG. 6, the device 30 may be configured to work with multiple car seats 52 within a vehicle 84 simultaneously. Preferably a secondary pressure pad 78 may be located on the seat base of a different vehicle seat 52 than the primary pressure pad 48. The device may be configured to send an alert signal when either the first 48 or the second pressure pads 78 sense the occupancy of the child. One of ordinary skill in the art will appreciate from this disclosure that any number of pressure pads 48 or other sensors may be used alone or in combination with one another without departing the scope of the present invention.

Figure 7:
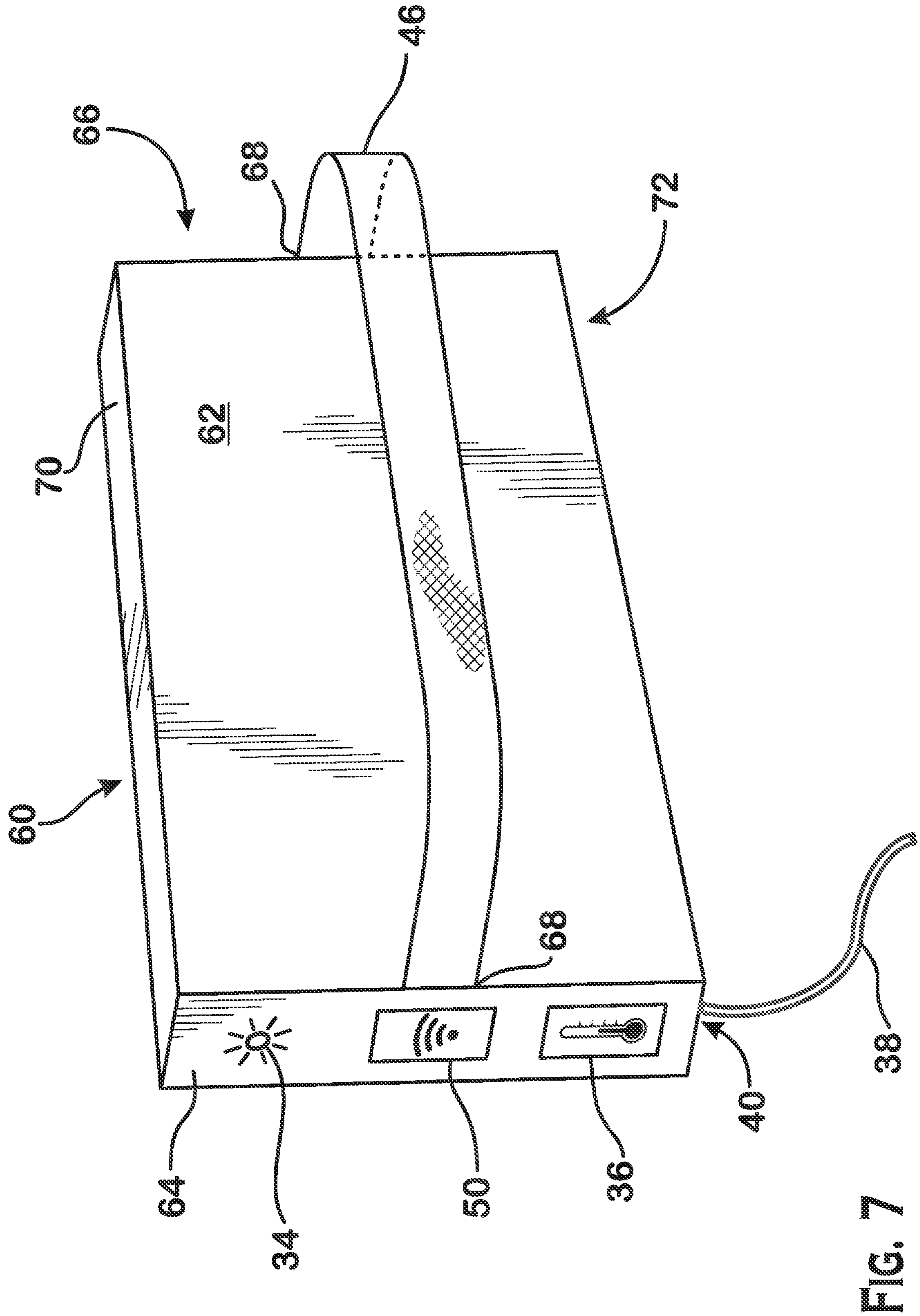
FIG. 7 is a three quarters perspective view of one preferred embodiment of the device 30 wherein an adjacent pressure pad 74 may be configured to record and report information regarding the occupancy of a second vehicle seat 52 to the control unit 32, alongside the first pressure pad 48. In this embodiment, the device 30 may be configured to monitor and report on dangerous conditions when at least one of a plurality of vehicle seats 52 are occupied.
Figure 8:
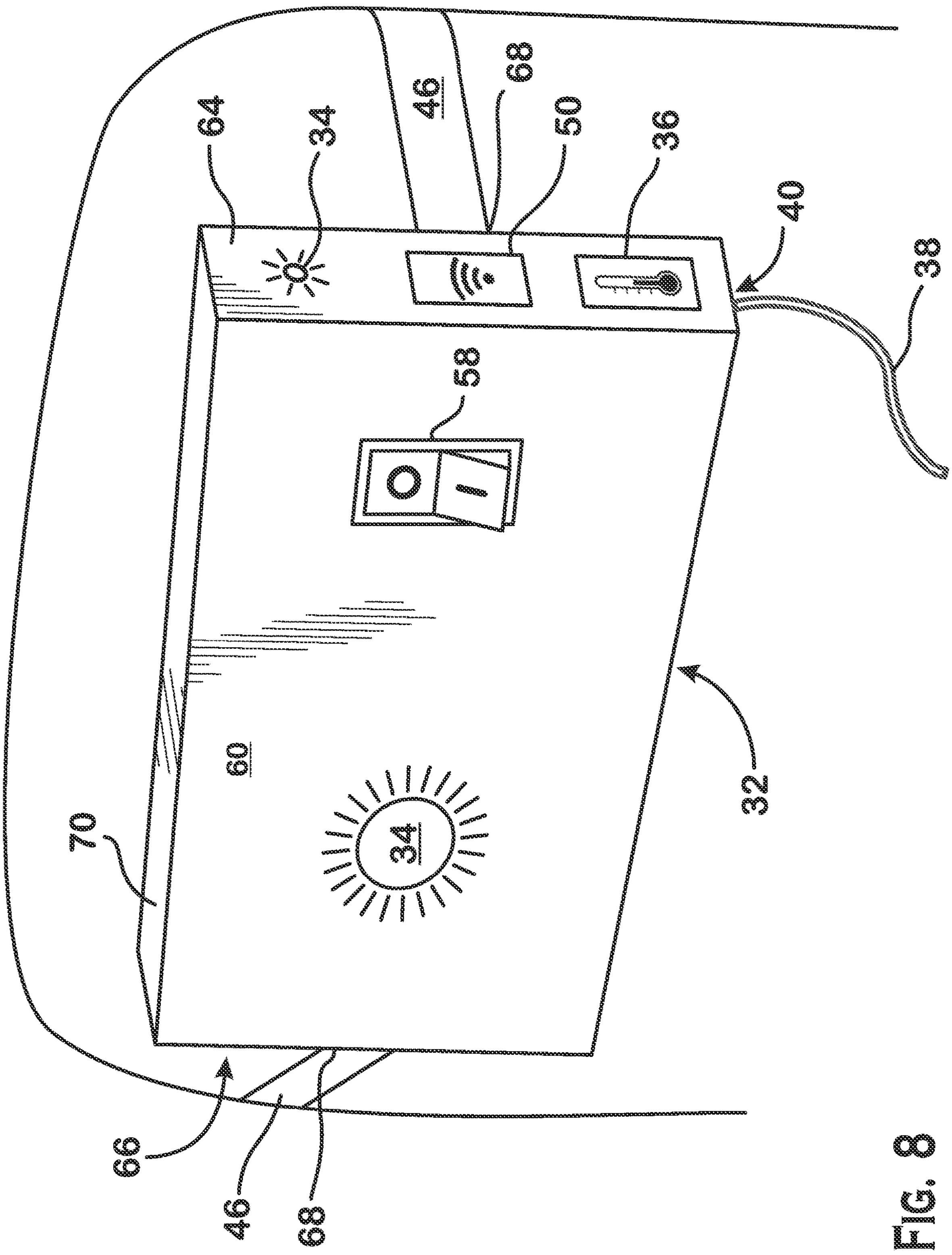
FIG. 8 is a three quarters perspective view of one preferred embodiment of the control unit 32 mounted to the rear of a vehicle seat 34. The control unit 32 may generally take an elongated cubic shape and may have a front panel 60, a rear panel, 62, a right panel 64, a left panel 66, a top panel 70, and a bottom panel 72 which generally comprise the exterior of the unit 32. The unit 32 may have a on/off switch 58 disposed on the rear surface, which is configured to engage and disengage the device. Preferably the device is configured to have a notification light 34 on the front 60 to report the status to users. The unit 32 may have a temperature sensor 36, a notification light 34, and a wireless communication chip 50 disposed on the right panel 64.
Figure 9:
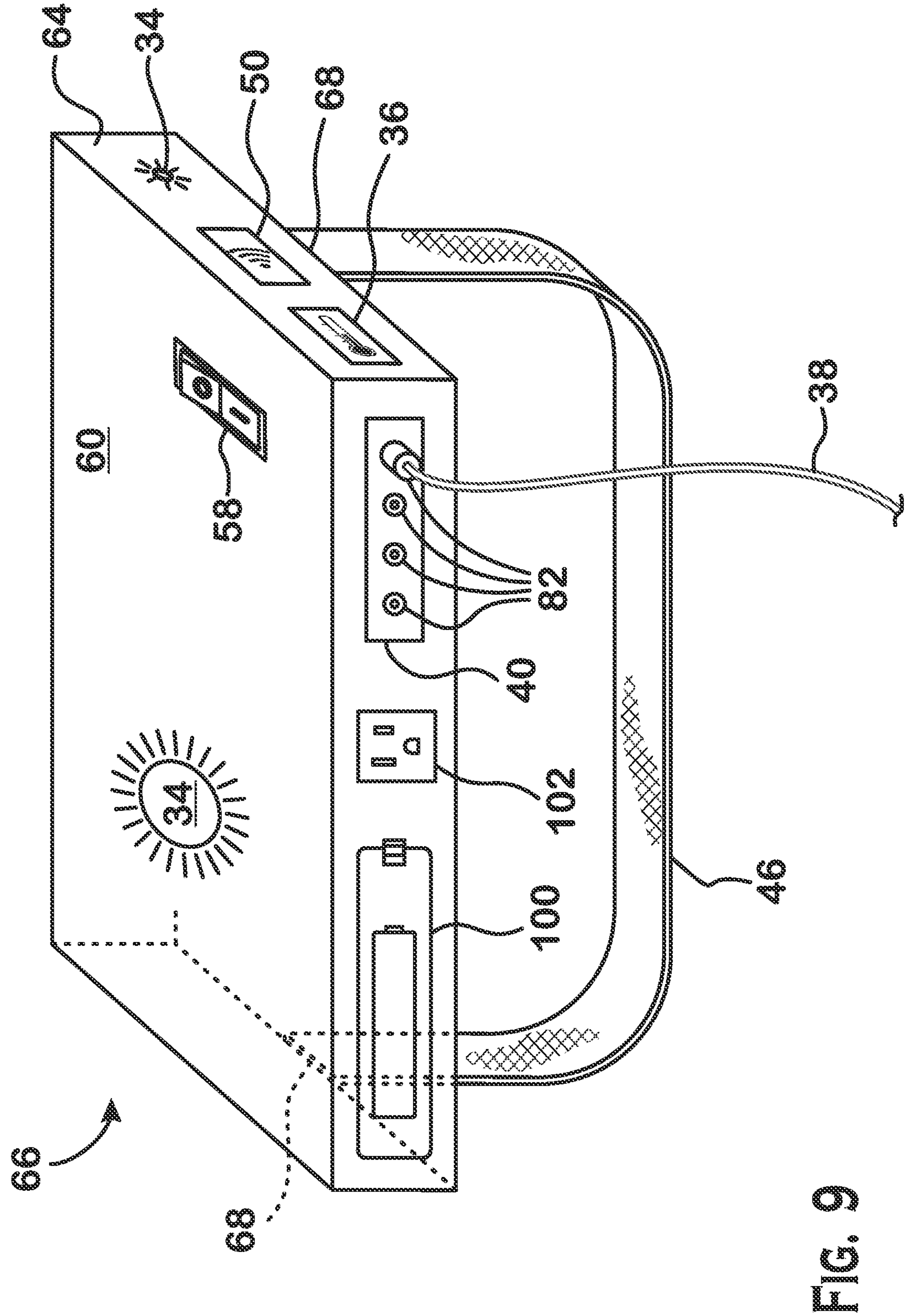
FIG. 9 is bottom-up three quarters perspective view of the present invention such that the bottom panel 72 is visible. The bottom panel may further comprise a battery unit 100, a power port 102, and an I/O block 40. The I/O block 40 may further have a plurality of I/O ports 82 thereon which are configured to accept connections from connection wires 38 which may provide a data connection for at least one external off-the shelf sensor.

Referring now to FIGS. 7-9, the control panel 32 may further comprise sensors 48, 36, switches 58, ports 82, notification lights 34, notification modules 50, and battery slots/internal batteries 100. Preferably the control panel is configured to receive signals from sensors located internally such as a temperature sensor 36, and aftermarket sensors located externally which may send data to the control unit 32 via I/O ports 82, located on an I/O block 40 of the panel 32. One of ordinary skill in the art will appreciate from this disclosure that the device 30 may accept signals from any type of sensor and may not necessarily accept signals from a pressure pad 48 and a temperature sensor 36, without departing from the scope of the present invention. The control panel 32 may be configured to accept off the shelf batteries via a battery slot 100 and/or direct power via a power connection point 102 which may be connected to a circuit within the vehicle 84. Preferably the device 30 is configured to run on electricity provided by the power connection point 102 while the vehicle 84 is running and use battery power 100 while the vehicle is off. The device 30 preferably charges the batteries 100 while the vehicle 84 is running. One of ordinary skill in the art will appreciate from this disclosure the device may be powered in any fashion without departing from the scope of the present invention. Preferably the device can be manually turned on and off via an ON/OFF switch 58 located on the front panel 60. The device 30 may be configured to engage notification lights 34 when the device 30 is turned on and an occupancy signal is simultaneously detected. Accordingly, the notification lights 34 inform a user that the device 30 is "armed" and will send an alert signal if the temperature within the vehicle exceeds or falls below acceptable values.

Figure 10:
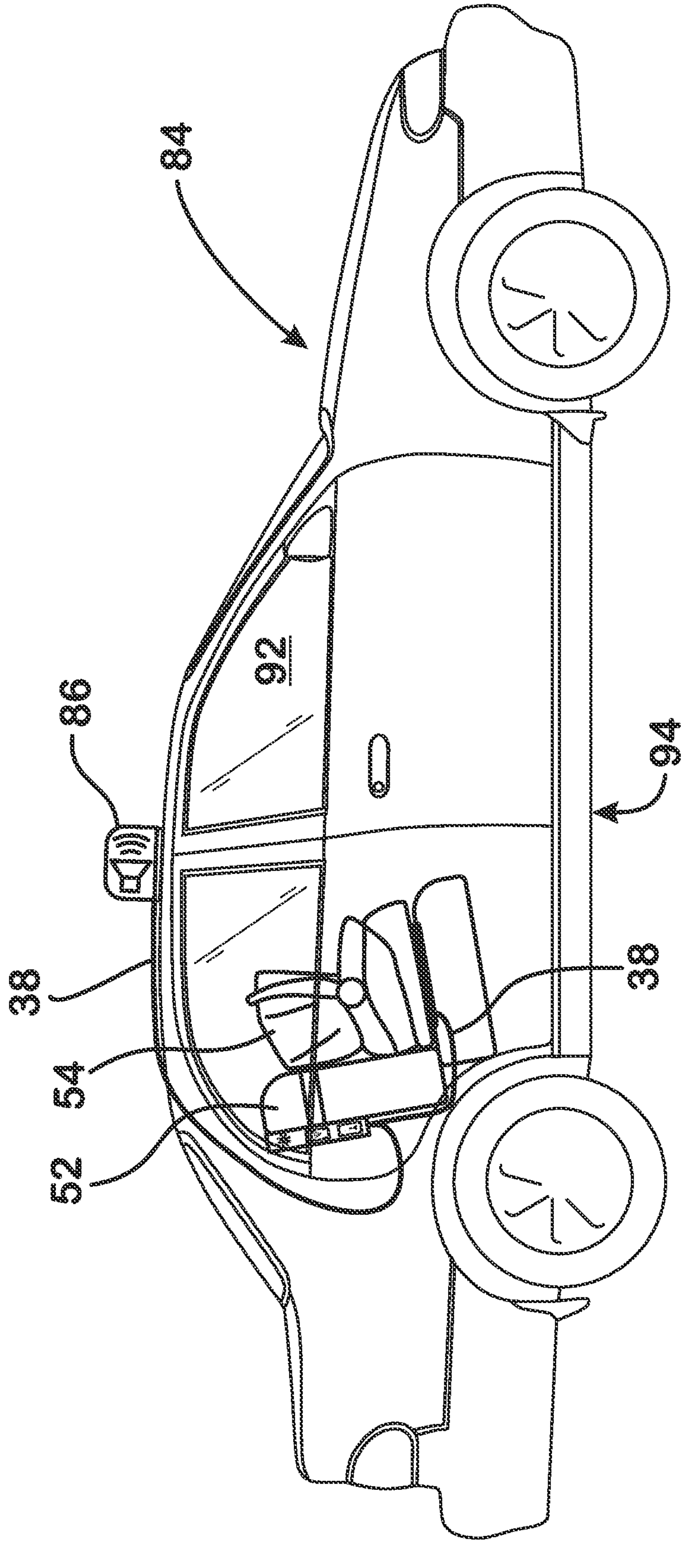
FIG. 10 is a side view of a vehicle with the device 30 of the present invention installed. Preferably the control unit 32 is disposed on a vehicle seat 52 and has a connection wire 38 running to the base of the vehicle seat 52 where it connects with a pressure pad 48. The finished child car seat 54 may be disposed on top of the pressure pad 48 such that the presence of a child in the finished child car seat 54 can be detected by the pressure pad 48. The device 30 may also be configured to connect, with another connection wire 38, to a notification speaker 86 disposed on the outside of the vehicle 84. Preferably the speaker 86 is configured to broadcast audio when an alert signal is received.
Figure 11:
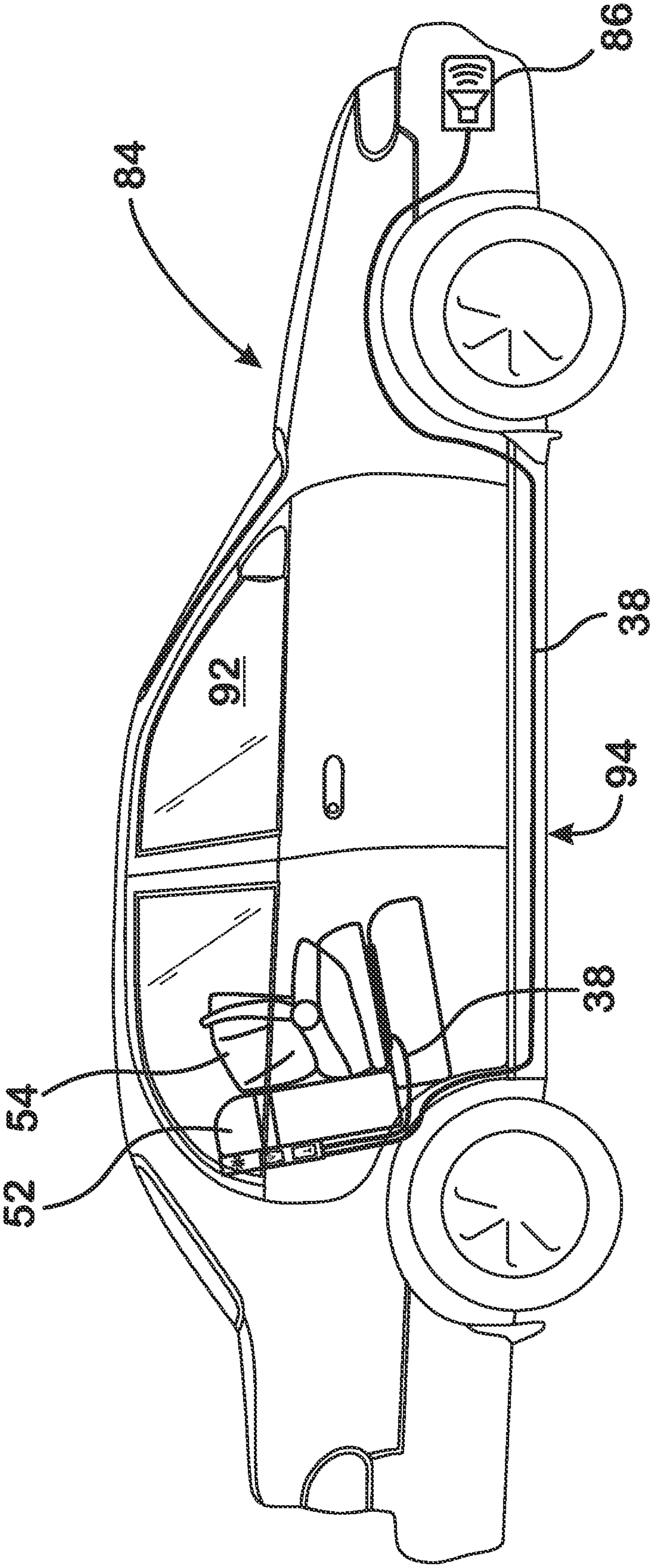
FIG. 11 is a side view of a vehicle 84 with a speaker 86 disposed on the inside of the vehicle's 84 engine compartment.
Figure 12:
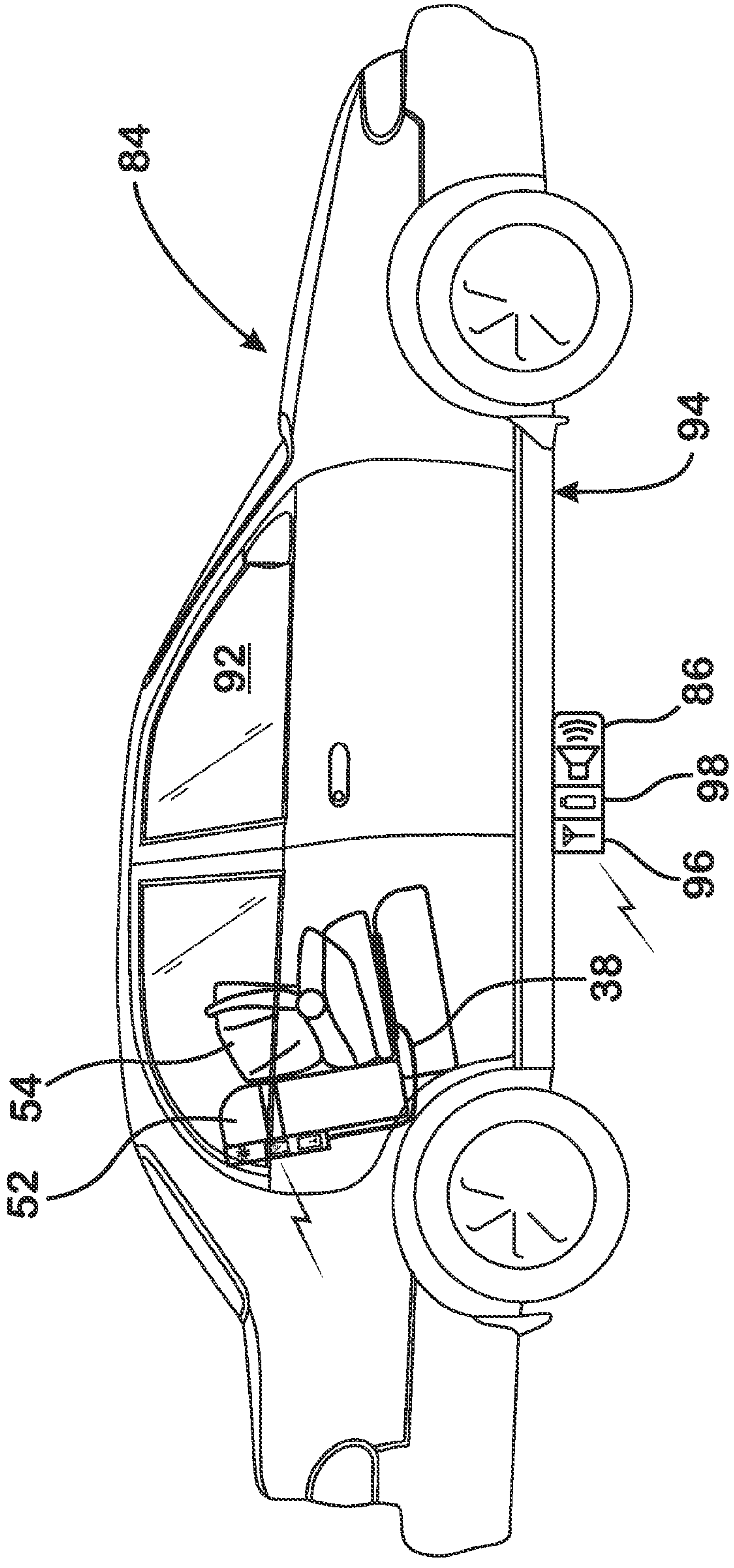
FIG. 12 is a side view of a vehicle 84 with a speaker 86 disposed on the underside 94 of a vehicle 84. Preferable the speaker is not wired to the control unit 32 and is configured to enclose a speaker wireless chip 96 and a speaker battery 98 which are configured to connect the speaker 86 to the control unit 32 and provide it with electricity.

Referring now to FIGS. 10-12, the device 30 may be configured to communicate with an aftermarket speaker 86 located on an external face of a vehicle 84. Preferably the speaker 86 is configured to generate an audible alarm when the alert signal is received from the notification module 50 of the device 30. This alert signal may be sent over a connection wire 38 or wirelessly to the speaker's wireless speaker connector 96. The speaker 86 may be powered by a connection from the control panel 32, speaker batteries 98, or a direct connection to the vehicle's power supply. One of ordinary skill in the art will appreciate from this disclosure that the speaker 86 may be powered by any combination of sources and communicate with the rest of the device 30 in any fashion, without departing from the scope of the present invention. Further, there may be any number of speakers 86, or lack thereof, without departing from the scope of the present invention. The speakers 86 may be configured to provide information to persons around the vehicle 84 while performing the alarm function. The speakers may indicate via verbal commands to persons around the vehicle concerning: the purpose of the alarm, how long the alarm has been engaged, what the make/model/color of the car 84 is, the name and contact information of the owner of the vehicle, the age of the child within the vehicle, the temperature within the vehicle, and may provide explicit instructions to those around the vehicle such as "call 911" or "please break window" after sufficiently long periods of time have elapsed.

Figure 13:
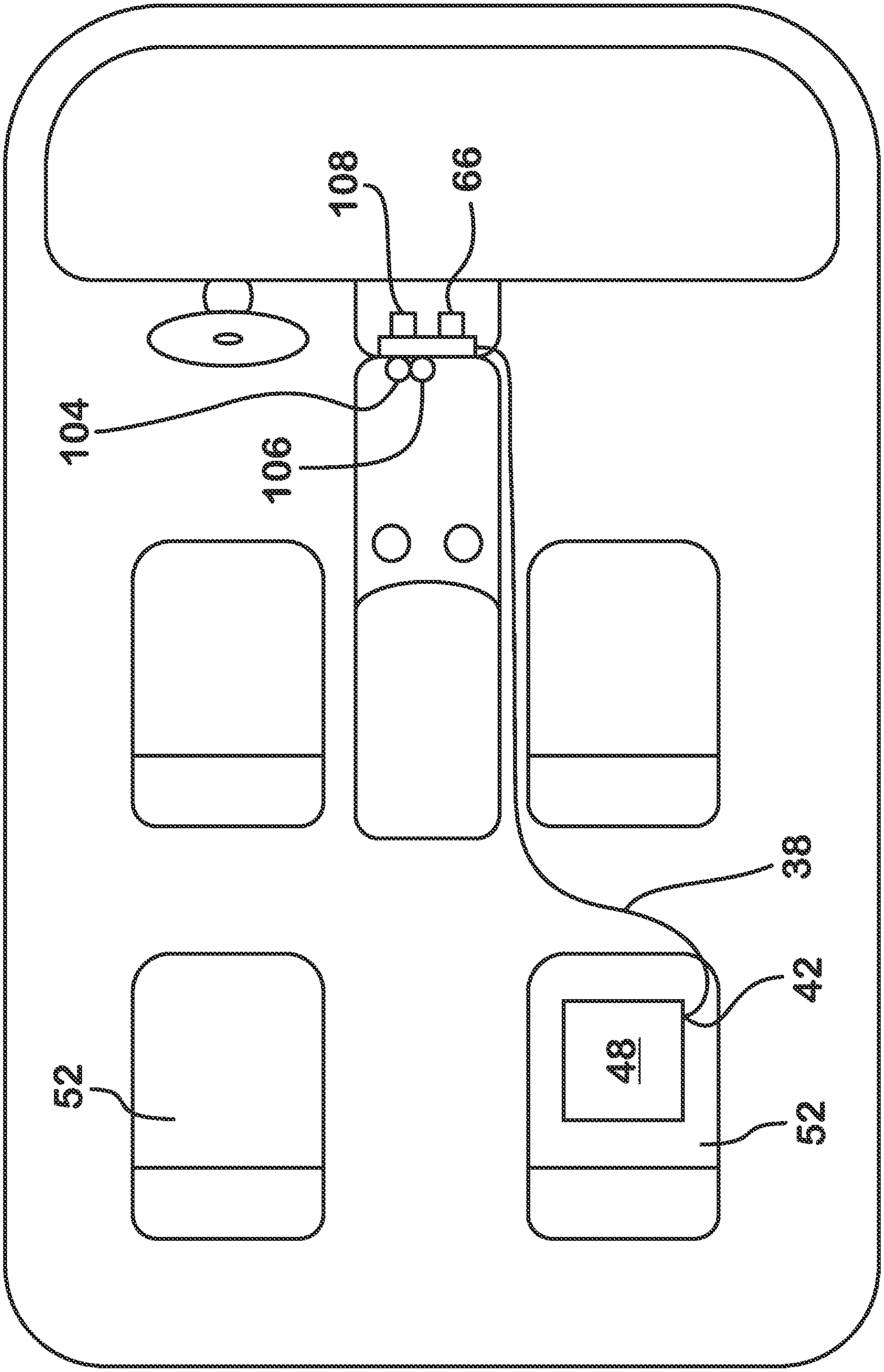
FIG. 13 is a top-down cutaway view of a vehicle 84 with the device 30 of the preset invention installed. Preferably the control unit 32 may be configured to be disposed in the front of the vehicle and have a connection wire 38 run back to seats 52 in the rear of the vehicle 52 for connection to pressure pads 48 thereon. Preferably the control unit 32 may be connected to the main electrical circuit of the vehicle 84 via a power cord 104 which may be configured to plug into a port on the vehicle 84 such as a cigarette lighter 106. Preferably the unit 32 is configured to be mountable on the front of the vehicle 84 via a sticky pad 108 on its rear panel 62.
Figure 14:
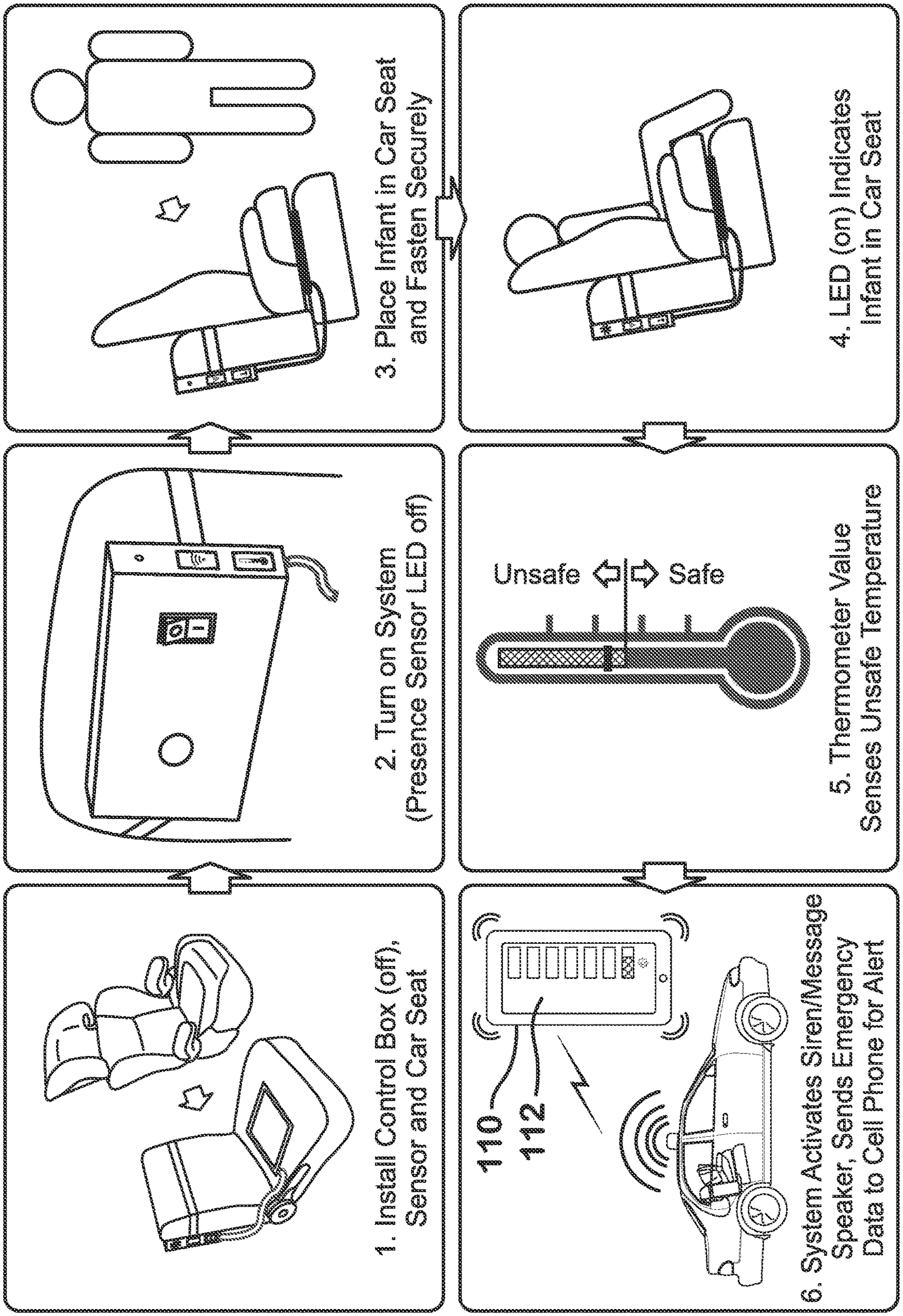
FIG. 14 is a flowchart of the operation of one embedment of the device 30. Preferably: 1) the device 30 can be separably installed into a car seat 52, between a finished car seat 52 and a finished child car seat 54, without the use of special tools; 2) the device may be turned on via an on/off switch 58 on the rear panel 62 of the unit 32; 3) a child may be placed into the finished child car seat 54; 4) notification lights 34 on the device 30 may be configured to light up, thereby indicating that the device 30 is both powered on and the presence of an occupant is detected by the pressure sensor 48; 5) preferably the device is then fully operational and engaged such that if the temperature sensor 36 detects that the temperature within the vehicle is outside of a predetermined acceptable range; 6) the control unit 32 may send an alert signal to a speaker 86 and/or a personal cellular device 110, running an alarm application 112.

Referring now to FIG. 13, the control panel 32 may be located at the front of a vehicle 84 and be connected with a power cable 104 to the electrical circuit of the vehicle via the car's 84 cigarette lighter 106 or similar electrical connection point such as a 3-prong outlet. Preferably the control panel 32 is affixed to the front of the vehicle 84 with a sticky pad 108. One of ordinary skill in the art will appreciate from this disclosure that the control panel 84 may be secured in any portion of the vehicle 84 by any attachment mechanism without departing from the scope of the present invention.

Figure 15:
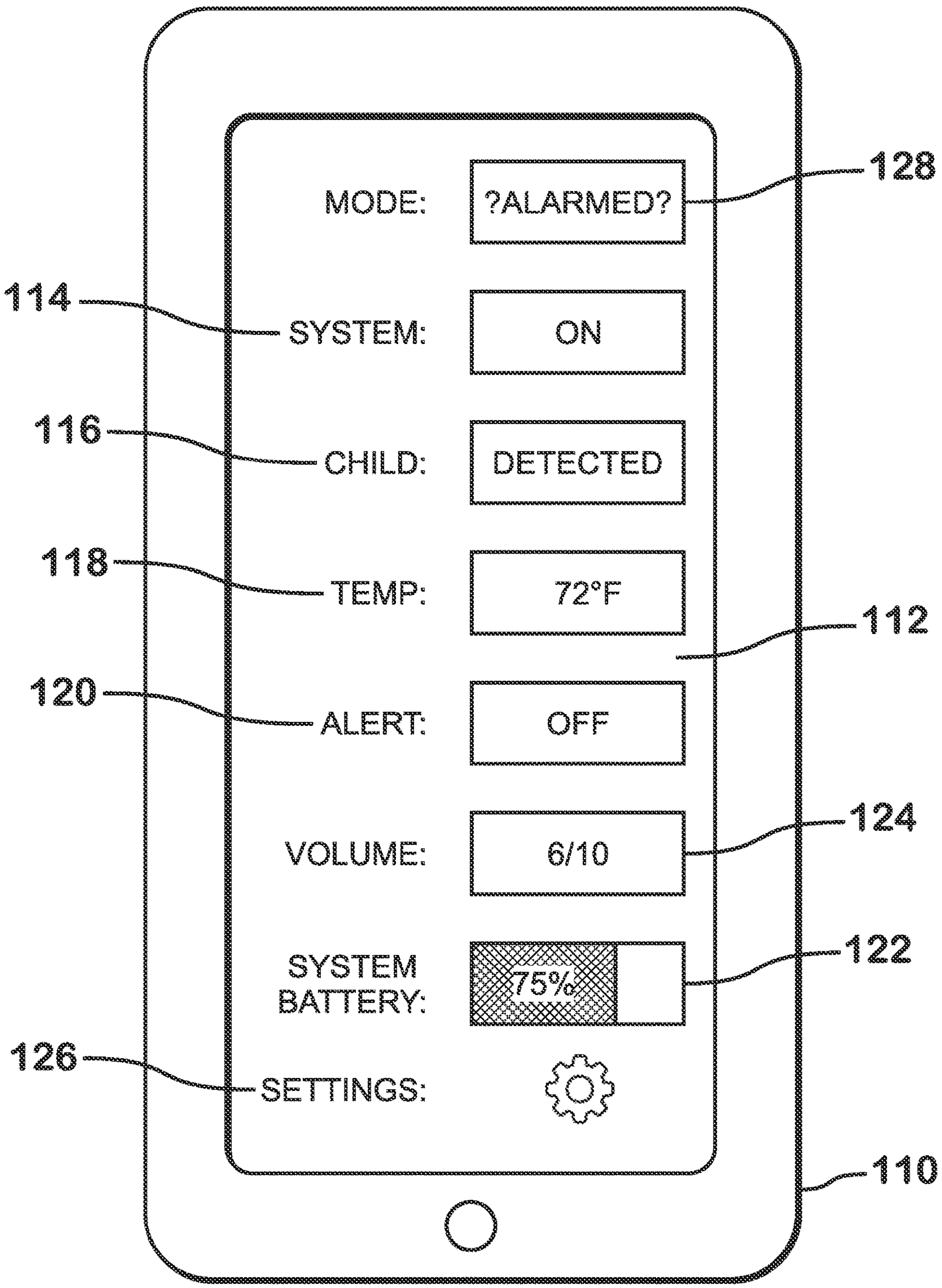
FIG. 15 is a view of a personal cellular device 110 running an alarm application 112. Preferably the application indicates On/Off status 114, current device mode 128, if an occupant is detected 116, the current temperature within the vehicle 118, if an alert condition is present 120, the volume of the speaker 124, and the control unit 32 battery level 122. Preferably the application also includes a settings option 126 which allows for the device 30 to be remotely controlled from the application.

Referring now to FIG. 15, the device 30 is preferably configured to interface with a dedicated cell phone application 112 which may run on a wireless personal device 110 and be in communication with the control panel 32. Preferably the application 112 is configured to report live readings of the sensors attached to the control panel 32. The application 112 may also be configured to utilize the vibration motor and speakers of the wireless personal device to alert users to the presence of an alert condition within the vehicle. The application 112 preferably allows for settings on the device 30 to be changed remotely.

Figure 16:
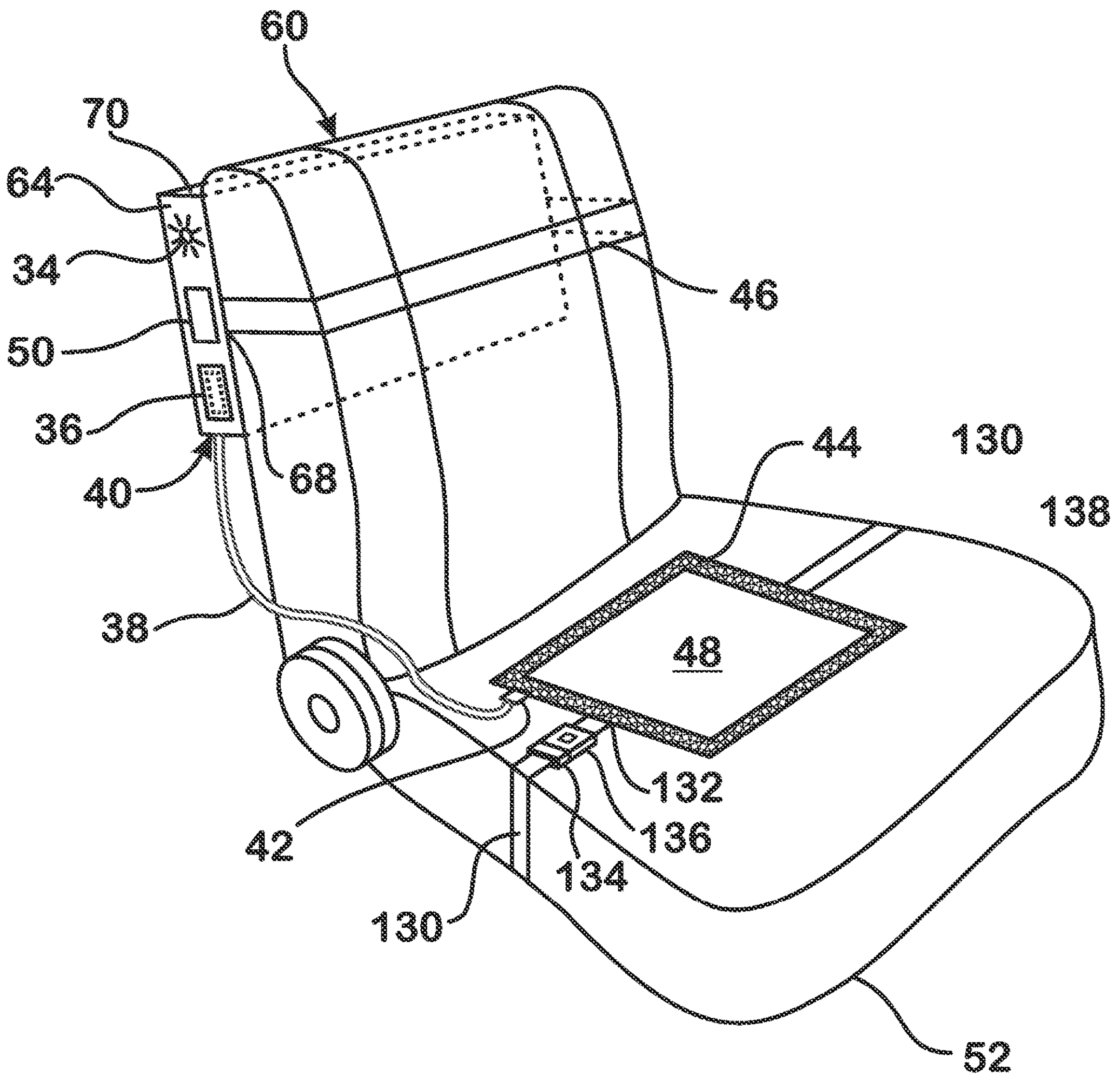
FIG. 16 is a three quarters perspective view of one preferred embodiment of the device 30 wherein the pressure pad 48 is affixed to the seat 52 base via a buckle 136. Preferably the buckle is connected to a pad strap 130 which may be placed around the body of a finished vehicle seat 52. The buckle 136 preferably has a male end 134 and a female end 132 which may separably join to affix the pad 48 to the seat 52.

Referring now to FIG. 16, preferably the pressure pad 48 of the device 30 can be configured to be secured to the seat base of a finished vehicle car seat 52 via a buckle mechanism 136. One of ordinary skill in the art will appreciate from this disclosure that the pressure pad 48 or any other component of the invention may be secured in place by any physical mechanism such as straps, adhesive, hooks and loops, hooks, or pins without departing from the scope of the present invention.

Figure 17:
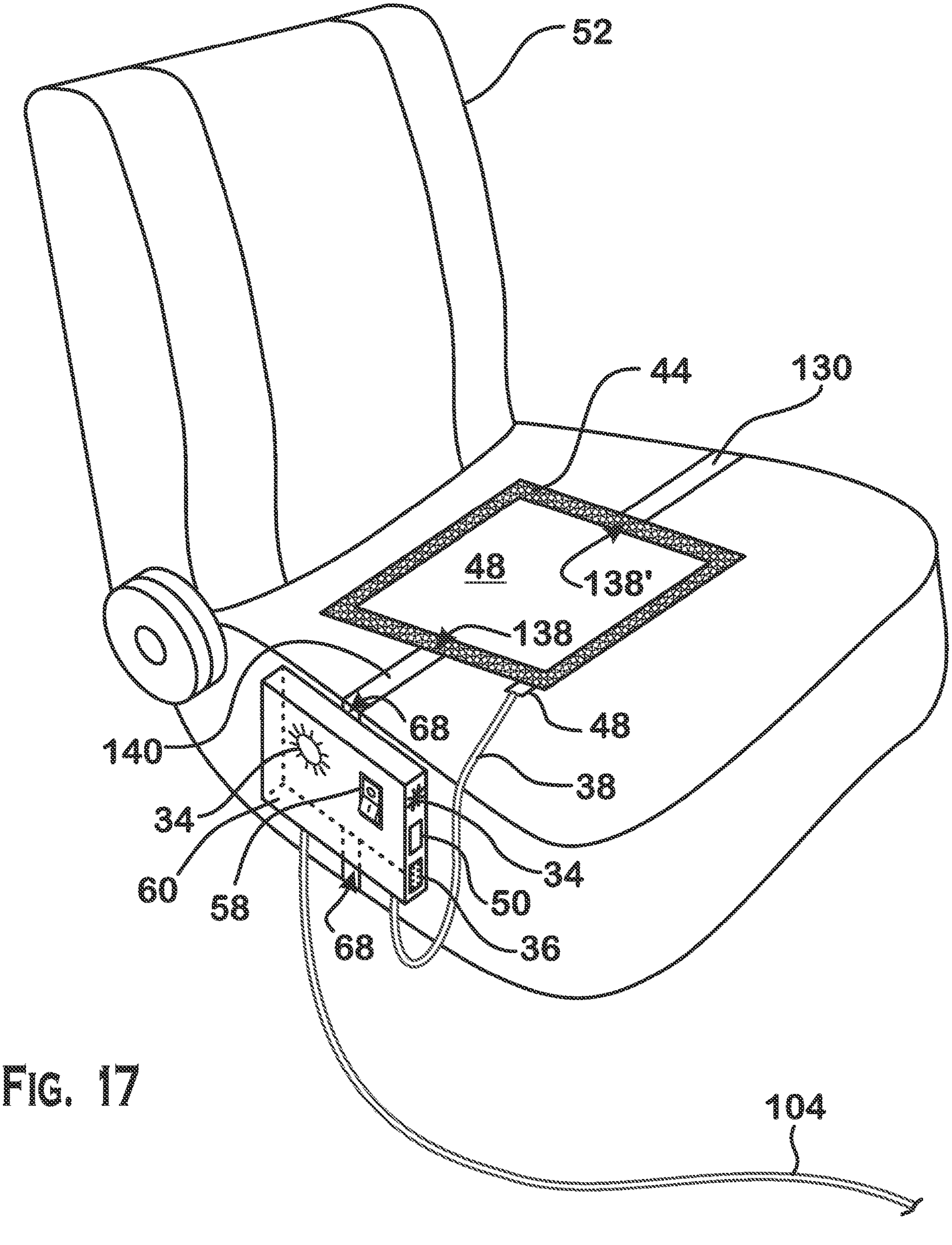
FIG. 17 is a three quarters perspective view of one preferred embodiment of the device 30 wherein the control unit is mounted the side of the vehicle seat 52 on a combination strap 140 which also holds the pressure pad 48 in place. Preferably the strap 140 is configured to interlock with the pressure pad at combo strap passage 138 defined by an absence of material in the underside of the pressure pad 48. Preferably the combo strap 140 joins with the control unit 32 at mounting strap points 68 on the rear panel 62 of the unit 32.

Referring now to FIG. 17, preferably the control unit 32 may be mounted to the side of the seat base of a finished vehicle seat 52 by sharing a common pressure pad strap 130 with the pressure pad 48. One of ordinary skill in the art will appreciate from this disclosure that the device may be mounted to the side, front, or any other portion of the vehicle without departing from the scope of the present invention.

Figure 18:
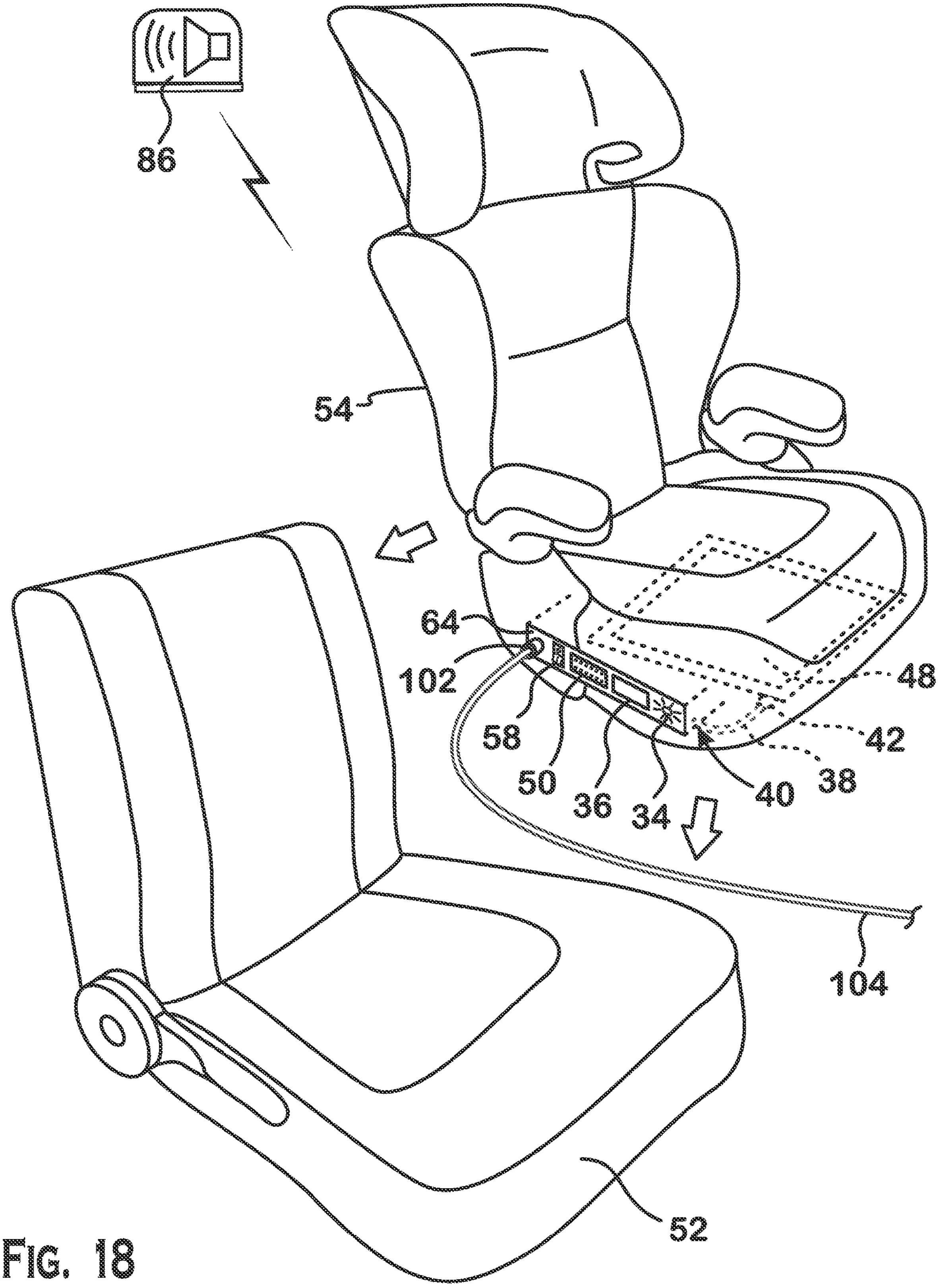
FIG. 18 is a three quarters perspective view of one preferred embodiment of the device 30 of the present invention. Preferably the device 30 may be configured to be permanently mounted within the body of a finished child car seat 54. In this configuration the side of the finished vehicle car seat may have sensors 36, lights 34, a power connection ports 102, and an on/off switch 60 disposed thereon. Preferably, the pressure pad 48 is also integrated with the finished child car seat 54 such that no instillation is required beyond strapping the finished child car seat 54 into the finished vehicle seat 52.

Referring now to FIG. 18, preferable the control unit 32 may be incorporated into the body of a child car seat 54. In this incorporated embodiment the pressure pad 48 and the control unit 32 are both physically and inseparably joined to the body of a child car seat 54. Preferably, the device 30 may communicate with external speakers 86 via wireless or wired methods and receive power either from internal batteries 100 or external battery power via a power connection point 102 which is joined with a power cord 104 to some internal circuit of the vehicle 84. One of ordinary skill in the art will appreciate from this disclosure that any portion of the invention may be incorporated physically into the child car seat 54, the vehicle seat 52, or any other portion of a vehicle without departing from the scope of the present invention.

The device 30 is preferably made of a tough, resilient, and lightweight material such as a plastic. However, those of ordinary skill in the art will appreciate that the materials from which the device 30 may be constructed can be varied without departing from the scope of the present invention. For example, the device 30 can be made of strong, impact resistant, inflexible material such as metal. By way of further example, the device 30 can be made of a robust, lightweight, easily manufactured, material such as aluminum. By way of further example, the device 30 can be made of a durable and resilient polymer such as polyvinyl chloride. By way of further example still, the device can be made of a pliant, not opaque, somewhat rigid material that can be injection molded such as a thermoplastic. By way of an alternative example, the device 30 can also be made of polycarbonate that is strong and inexpensive to manufacture. By way of an alternative example, various portions of the device may be made of different materials such that the control unit 32 is comprised of a plastic and the pressure pad is comprised of sensors enshrouded in a fabric.

While the preferred embodiment is disclosed above, those of ordinary skill in the art will appreciate from this disclosure that the structure of the device can be varied without departing from the scope of the present invention. For example, one of ordinary skill in the art will appreciate from this disclosure that device elements, as well as materials, shapes, and dimensions of device elements, as well as methods other than those specifically exemplified can be employed in the practice of the invention without resorting to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention.

What is claimed is:

1. A method of modifying a vehicle and modifying a finished child car seat to notify a user to an alert condition of the finished child car seat, comprising: providing a vehicle having a vehicle seat, the vehicle seat having a seat base and a seat back; providing the finished child car seat which is free of electronics in a finished state, the finished child car seat having a child holding area, the finished child car seat also having an outer surface; securing the finished child car seat to the vehicle seat; attaching a sensor to the finished child car seat to detect an occupant positioned in the child holding area, the sensor configured to provide an occupancy signal when an occupant is present in the child holding area, the sensor being located on the car seat base such that the sensor is positioned between the finished child car seat and the seat base when the finished child car seat is secured to the vehicle seat; locating a control unit on the outer surface of the finished child car seat, the control unit being in communication with the sensor and configured to receive the occupancy signal, the control unit having a temperature sensor and a notification module positioned therein; the control unit being configured to determine when an alert condition exists, an alert condition existing when the occupant is in the child car seat and the temperature in the vehicle is either one of: (1) above a first predetermined temperature, or (2) below a second predetermined 22 temperature, the notification module sending an alert signal when the control unit detects the alert condition; and positioning an aftermarket speaker within an engine compartment of the vehicle and in communication with the notification module, the aftermarket speaker being configured to generate an audible alarm when the alert signal is received from the notification module, wherein the audible alarm includes the audible recitation of emergency contact information and an initial time of the alert signal.

2. The method of claim 1, wherein the step of locating a control unit further comprises the notification module having a wireless transceiver configured to broadcast an alert signal to the aftermarket speaker.

3. The method of claim 1, wherein the step of locating a control unit further comprises the notification module having a wireless transceiver configured to send an alert signal to a wireless personal device.

4. The method of claim 1, wherein the step of locating a control unit further comprises the notification module comprises both: (1) a wireless transceiver configured to broadcast an alert signal to the aftermarket speaker; and (2) a wireless transceiver configured to send an alert signal to a wireless personal device.

5. The method of claim 1, further comprising the step of positioning a second aftermarket speaker on the interior of the vehicle.

6. The method of claim 1 wherein the step of locating a control unit further comprises the control unit being adjacent to the rear portion of the outer surface of the vehicle seat.

7. The method of claim 1, wherein the step of locating the control unit further comprises the control unit being positioned adjacent the seat base and on an outer surface of a bottom of the finished child car seat.

8. The method of claim 7, wherein the step of locating the control unit further comprises the control unit is held in position on the finished child car seat using an attachment mechanism.

9. The method of claim 8, wherein the step of locating the control unit further comprises the attachment mechanism being at least one of the group of: an adjustable strap, hooks and loop material, cable ties, snaps, zippers, and hooks.

10. The method of claim 1, wherein the step of locating the control unit further comprises the control unit and the notification device being powered by at least one battery.

11. The method of claim 1, wherein the step of locating the control unit further comprises the control unit and notification device being powered by electricity supplied by the vehicle.

12. The method of claim 1, wherein the step of locating the control unit further comprises the control unit and notification device being powered by an internal battery while the vehicle is not running and powered by current supplied by the vehicle when it is running.

13. The method of claim 2, further comprising powering the aftermarket speaker on the exterior of the vehicle by connecting a wire from the engine compartment to the exterior of the vehicle.

14. The method of claim 13, further comprising a light integrated into the aftermarket speaker on the exterior of the vehicle such that the light and the aftermarket speaker are powered by the wire from the engine compartment; connecting a second wire to the control unit and to the aftermarket speaker such that the alert signal is sent via a wired connection; providing a second finished child car seat being free of electronics and securing the second finished car seat to the vehicle seat; and attaching a second sensor to the second finished child car seat, such that the control unit is configured to function with both the sensor on the finished child car seat and with the second sensor on the second finished child car seat.

15. The method of claim 14, further comprising providing a notification device configured to receive communication from the notification module and generate an audible alarm when the notification module sends the alert signal.

16. A method of modifying a vehicle and modifying a finished child car seat to notify a user to an alert condition of the finished child car seat, comprising: providing a vehicle having a vehicle seat, the vehicle seat having a seat base and a seat back; providing the finished child car seat which is free of electronics in a finished state, the finished child car seat having a child holding area, the finished child car seat also having an outer surface; securing the finished child car seat to the vehicle seat; attaching a sensor to the finished child car seat to detect an occupant positioned in the child holding area, the sensor configured to provide an occupancy signal when an occupant is present in the child holding area, the sensor being located on the car seat base such that the sensor is positioned between the finished child car seat and the seat base when the finished child car seat is secured to the vehicle seat; locating a control unit on the outer surface of the finished child car seat, the control unit being in communication with the sensor and configured to receive the occupancy signal, the control unit having a temperature sensor and a notification module positioned therein; the control unit being configured to determine when an alert condition exists, an alert condition existing when the occupant is in the child car seat and the temperature in the vehicle is either one of: (1) above a first predetermined temperature, or (2) below a second predetermined temperature, the notification module sending an alert signal when the control unit detects the alert condition; and positioning an aftermarket speaker within an engine compartment of the vehicle and in communication with the notification module, the aftermarket speaker being configured to generate an audible alarm when the alert signal is received from the notification module, wherein the audible alarm includes the audible recitation of emergency contact information and an initial time of the alert signal.

17. The method of claim 16, wherein the step of locating a control unit further comprises the control unit being adjacent to the rear portion of the outer surface of the finished child car seat and adjacent to the seat back, the step of locating the control unit further comprises using hook and loop material to secure the control unit; the control unit and the notification device being powered by at least one battery: the control unit and notification device being powered by the at least one battery while the vehicle is not running and powered by current supplied by the vehicle when the vehicle is on; connecting a second wire to the control unit and to the aftermarket speaker such that the alert signal is sent via a wired connection.

18. A method of modifying a vehicle and modifying a finished child car seat to notify a user to an alert condition of the finished child car seat, comprising:

providing a vehicle having a vehicle seat, the vehicle seat having a seat base and a seat back;

providing the finished child car seat which is free of electronics in a finished state, the finished child car seat having a child holding area, the finished child car seat also having an outer surface;

securing the finished child car seat to the vehicle seat;

attaching a sensor to the finished child car seat to detect an occupant positioned in the child holding area, the sensor configured to provide an occupancy signal when an occupant is present in the child holding area, the sensor being located on the car seat base such that the sensor is positioned between the finished child car seat and the seat base when the finished child car seat is secured to the vehicle seat;

locating a control unit on the outer surface of the finished child car seat, the control unit being in communication with the sensor and configured to receive the occupancy signal, the control unit having a temperature sensor and a notification module positioned therein;

the control unit being configured to determine when an alert condition exists, an alert condition existing when the occupant is in the child car seat and the temperature in the vehicle is either one of: (1) above a first predetermined temperature, or (2) below a second predetermined temperature, the notification module sending an alert signal when the control unit detects the alert condition; and positioning an aftermarket speaker within the engine compartment of the vehicle and in communication with the notification module, the aftermarket speaker being configured to generate an audible alarm when the alert signal is received from the notification module, wherein the audible alarm includes the audible recitation of emergency contact information and an initial time of the alert signal.

19. The method of claim 18, wherein audible alarm also states how long the alarm has been sounding.

20. The method of claim 19, wherein when the audible alarm has been sounding for a predetermined period of time, the audible alarm changes to provide verbal communication of an immediate child endangerment situation.

* * * * *